United States Patent [19]
Fenton et al.

[11] Patent Number: 5,390,207
[45] Date of Patent: Feb. 14, 1995

[54] PSEUDORANDOM NOISE RANGING RECEIVER WHICH COMPENSATES FOR MULTIPATH DISTORTION BY DYNAMICALLY ADJUSTING THE TIME DELAY SPACING BETWEEN EARLY AND LATE CORRELATORS

[75] Inventors: Patrick Fenton, Calgary, Canada; Albert J. Van Dierendonck, Los Altos, Calif.

[73] Assignee: NovAtel Communications Ltd., Canada

[21] Appl. No.: 217,768

[22] Filed: Mar. 24, 1994

Related U.S. Application Data

[63] Continuation of Ser. No. 825,665, Jan. 24, 1992, abandoned, which is a continuation-in-part of Ser. No. 619,316, Nov. 28, 1990, Pat. No. 5,101,416.

[51] Int. Cl.⁶ .......................... G01S 5/02; H04B 7/185
[52] U.S. Cl. ........................................ 375/1; 342/357
[58] Field of Search ............................. 375/1; 342/357

[56] References Cited

U.S. PATENT DOCUMENTS

| | | |
|---|---|---|
| 4,426,712 | 1/1984 | Gorski-Popiel . |
| 4,457,006 | 6/1984 | Maine . |
| 4,530,103 | 7/1985 | Mosley, Jr. et al. . |
| 4,611,333 | 9/1986 | McCallister et al. . |
| 4,754,465 | 6/1988 | Trimble . |
| 4,785,463 | 11/1988 | Janc et al. . |
| 4,791,378 | 12/1988 | Waltham . |
| 4,800,577 | 1/1989 | Tachita et al. . |
| 4,807,256 | 2/1989 | Holmes et al. . |
| 4,821,294 | 4/1989 | Thomas, Jr. . |
| 4,894,842 | 1/1990 | Broekhoven et al. . |
| 5,101,416 | 3/1992 | Fenton et al. ........................ 375/1 |

FOREIGN PATENT DOCUMENTS

| | | |
|---|---|---|
| 0312193 | 7/1988 | European Pat. Off. . |
| 0351156 | 7/1989 | European Pat. Off. . |
| 2215539 | 3/1988 | United Kingdom . |

OTHER PUBLICATIONS

Article entitled *Proceedings of the Satellite Division International Technical Meeting*, Sep. 19–23, 1988.
Langley, R. B., "Why is the GPS Signal So Complex?", *GPS World*, May/Jun. 1990, pp. 56–59.
Hagerman, L. L., "Effects of Multipath on Coherent and Non-Coherent Ranging Receivers", *The Aerospace Corporation Report* No. TOR–0073 (3020–03)–3, 15 May 1973.

Primary Examiner—David C. Cain
Attorney, Agent, or Firm—Cesari & McKenna

[57] ABSTRACT

A receiver for pseudorandom noise (PRN) encoded signals consisting of a sampling circuit, multiple carrier and code synchronizing circuits, and multiple digital autocorrelators. The sampling circuit provides digital samples of a received composite signal to each of the several receiver channel circuits. The synchronizing circuits are preferably non-coherent, in the sense that they track any phase shifts in the received signal and adjust the frequency and phase of a locally generated carrier reference signal accordingly, even in the presence of Doppler or ionospheric distortion. The autocorrelators in each channel form a delay lock loop (DLL) which correlates the digital samples of the composite signal with locally generated PRN code values to produce a plurality of (early, late), or (punctual, early-minus-late) correlation signals. Thus, during an initial acquisition mode, the delay spacing is relatively wide, on the order of approximately one PRN code chip time. However, once PRN code synchronism has been achieved, the code delay spacing is narrowed, to a fraction of a PRN code chip time. There are several advantages to this arrangement, especially in environments wherein multipath distortion in the received composite signal is of the same order of magnitude as a PRN code chip time.

19 Claims, 11 Drawing Sheets

PSEUDORANDOM NOISE RANGING RECEIVER WHICH COMPENSATES FOR MULTIPATH DISTORTION BY DYNAMICALLY ADJUSTING THE TIME DELAY SPACING BETWEEN EARLY AND LATE CORRELATORS

CROSS REFERENCE TO RELATED APPLICATION

This application is a continuation of application 07/825,665, filed Jan. 24, 1992, now abandoned, which is a continuation-in-part of a U.S. patent application, Ser. No. 07/619,316, filed Nov. 28, 1990, now U.S. Pat. No. 5,101,416, issued Mar. 31, 1992, entitled "Multi-Channel Digital Receiver for Global Positioning System", by Patrick Fenton, Keith Ng, and Thomas Ford, and assigned to NovAtel Communications Ltd., the assignee of the present application, which is hereby incorporated by reference.

FIELD OF THE INVENTION

This invention relates generally to digital radios which receive pseudorandom noise (PRN) encoded signals such as those used in navigation systems, and particularly to such a receiver adapted for use in signalling environments susceptible to multipath fading.

BACKGROUND OF THE INVENTION

Passive pseudorandom noise (PRN) ranging systems such as the United States' Global Positioning System (GPS) and the Russian Global Navigation System (GLONASS) allow a user to precisely determine his latitude, longitude, elevation and time of day. PRN ranging system receivers typically accomplish this by using time difference of arrival and Doppler measurement techniques on precisely-timed signals transmitted by orbiting satellites. Because only the satellites transmit, the need for two-way communications is avoided, and an infinite number of receivers may thus be served simultaneously.

In order for the receivers to extract the requisite information, the signals transmitted by the satellites must contain certain information. For example, within the GPS system, each carrier signal is modulated with low frequency (typically 50 Hz) digital data which indicates the satellite's ephemeris (i.e. position), current time of day (typically a standardized time, such as Greenwich Mean Time), and system status information.

Each carrier is further modulated with one or more unique, high frequency pseudorandom noise (PRN) codes, which provide a mechanism to precisely determine the signal transmission time from each satellite. Different types of PRN codes are used for different system applications. For example, within the GPS system, a so-called low-frequency "C/A code" is used for low cost, less accurate commercial applications, and a higher-frequency "P-code" is used for higher accuracy military applications.

Thus, a typical PRN receiver receives a composite signal consisting of one or more of the signals transmitted by the satellites within view, that is within a direct line-of-sight, as well as noise and any interfering signals. The composite signal is first fed to a downconverter which amplifies and filters the incoming composite signal, mixes it with a locally generated carrier reference signal, and thus produces a composite intermediate frequency (IF) signal. A decoder or channel circuit then correlates the composite signal by multiplying it by a locally generated version of the PRN code signal assigned to a particular satellite of interest. If the locally generated PRN code signal is properly timed, the digital data from that particular satellite is then properly detected.

Because the signals transmitted by different satellites use unique PRN codes and/or unique carrier frequencies, the receiver signals from different satellites are automatically separated by the multiplying process, as long as the locally generated PRN code has the proper timing. A delay lock loop (DLL) tracking system which correlates early, punctual, and late versions of the locally generated PRN code signal against the received composite signal is also typically used to maintain PRN code lock in each channel. The receiver's three dimensional position, velocity and precise time of day is then calculated by using the PRN code phase information to precisely determine the transmission time from at least four satellites, and by detecting each satellite's ephemeris and time of day data.

For more information on the format of the GPS CDMA system signals, see "Interface Control Document ICD-GPS-200, Sep. 26, 1984", published by Rockwell International Corporation, Satellite Systems Division, Downey, Calif. 90241.

For more information on the format of the GLONASS system signals, see "The GLONASS System Technical Characteristics and Performance", Working Paper, Special Committee on Future Air Navigation Systems (FANS), International Civil Aviation Organization (ICAO), Fourth Meeting, Montreal, Quebec, Canada, 2-20 May 1988.

A number of problems face the designer of PRN receivers. One problem concerns accurate phase and frequency tracking of the received signals; another problem concerns the correction of relative divergence between the received signals and the local PRN code signal generators in the presence of ionospheric distortion. In addition, because GPS systems depend upon direct line of sight for communication propagation, any multipath fading can further distort received signal timing estimates.

Certain GPS system designers have realized that the tracking error caused by multipath distortion in the out-of-phase condition can be reduced by narrowing the delay spacing between the early and late correlators in the DLL. However, this has heretofore not been thought to be advantageous under a wide range of operating conditions, since the DLL is then more susceptible to loss of lock due to sudden dynamic motions of the receiver. See, for example, Hagerman, L. L., "Effects of Multipath on Coherent and Non-coherent PRN Ranging Receiver", Aerospace Corporation Report No. TOR-0073(3020-03)-3, 15 May 1973.

As a result, most present-day PRN receivers use a DLL time-delay spacing of one PRN code bit (or chip) time. Historically, there have been several reasons for this adherence to one chip-time spacing.

For example, early PRN receivers were invariably of the P-code, or high frequency variety. Since P-code chip time is relatively narrow as compared with the correlator DLL spacing, it was feared that Doppler and random noise considerations would cause loss of PRN code lock if the correlator spacing was made any narrower.

Furthermore, narrower correlator spacing is not particularly desirable, as it increases the time required to lock onto a given PRN signal. This is of particular concern in PRN ranging systems, where often times many codes and code delays must be tried.

Finally, it has been thought that because a narrowed correlator spacing requires a higher precorrelation bandwidth, the resulting higher sampling rates and higher digital signal processing rates were not justified.

What is needed is a way to reduce the tracking errors present in PRN ranging receivers, especially those of the lower-frequency C/A code type, in the presence of multipath fading, without degrading the signal acquisition capability of the receiver, or increasing errors due to Doppler shift, sudden receiver motion, or other noise sources.

SUMMARY OF THE INVENTION

Briefly, the invention is an improved receiver for pseudorandom noise (PRN) encoded signals consisting of a sampling circuit, multiple carrier and code synchronizing circuits, and multiple digital autocorrelators which form a delay locked loop (DLL) having dynamically adjustable code delay spacing.

The sampling circuit provides high-rate digital samples of a received composite signal to each of the several receiver channels. Each receiver channel includes a synchronizing circuit and a least two autocorrelators. The synchronizing circuits are non-coherent, in the sense that they track any phase shifts in the received signal and adjust the frequency and phase of a locally generated carrier reference signal accordingly, even in the presence of Doppler or ionospheric distortion. The autocorrelators in each channel form a delay lock loop (DLL) which correlates the digital samples of the composite signal with locally generated PRN code values to produce a plurality of (early, late), or (punctual, early-minus-late) correlation signals. The time delay spacing between the (early, late), and (punctual, early-minus-late) correlation signals is dynamically adjustable. Thus, during an initial acquisition mode, the delay spacing is relatively wide, on the order of approximately one PRN code chip time. However, once PRN code synchronizm has been achieved, the code delay spacing is narrowed, to a fraction of a PRN code chip time.

There are several advantages to this arrangement, especially in environments such as GPS C/A code applications wherein the multipath distortion in the received composite signal is of the same order of magnitude as a PRN code chip time. The PRN receiver is capable of acquiring carrier and code lock over a wide range of operating conditions, and once it is locked, will remain locked, even in the presence of multipath distortion.

Noise reduction is achieved with the narrower DLL spacing because the non-coherent synchronizer provides noise components of the (early, late) or (punctual, early-minus-late) signals which are correlated, and thus tend to cancel one another.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
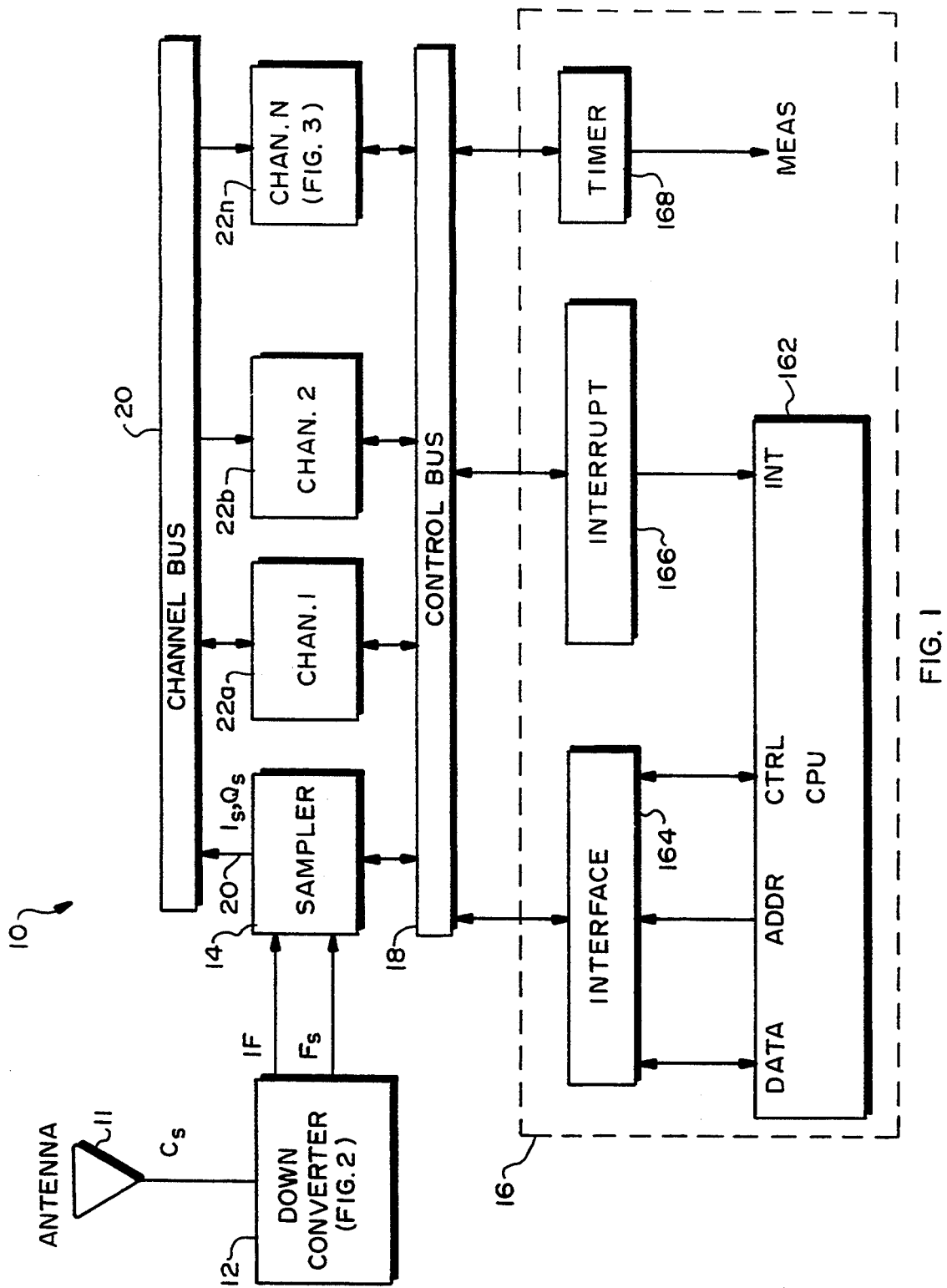
FIG. 1 is a block diagram of a PRN receiver which operates according to the invention, including its downconverter, sampler, channel, and processor circuits.

Now turning attention to the drawings, FIG. 1 is an overall block diagram of a pseudorandom noise (PRN) ranging receiver 10 constructed in accordance with the invention. It includes an antenna 11, a downconverter 12, an in-phase and quadrature sampler 14, a processor 16, a control bus 18, a channel bus 20 and multiple channels 22a, 22b, . . . , 22n, (collectively, the channels 22). The illustrated receiver 10 will be primarily described as operating within the United States' Global Positioning System (GPS) using the so-called C/A codes, however, adaptations to other PRN ranging systems are also possible.

The antenna 11 receives a composite signal $C_s$ consisting of the signals transmitted from all participating satellites within view, that is, within a direct line of sight of the antenna 11. When the GPS system is fully operational world-wide, twenty-four satellites will be in operation, with as many as eleven GPS satellites being received simultaneously at some locations.

The composite signal $C_s$ is forwarded to the downconverter 12 to provide an intermediate frequency signal, IF, which is a downconverted and filtered version of the composite signal $C_s$. The downconverter 12 also generates a sample clock signal, $F_s$, which indicates the points in time at which samples of the IF signal are to be taken by the sampler 14. The downconverter 12 is discussed in greater detail in connection with FIG. 2.

The sampler 14 receives the IF and $F_s$ signals and provides digital samples of the IF signal to the channels 22 via the channel bus 20. The samples consist of in-phase ($I_s$) and quadrature ($Q_s$) amplitude samples of the IF signal taken at the times indicated by the $F_s$ signal, typically by an analog-to-digital converter which samples at precisely 90° phase rotations of the IF signal's carrier frequency. The Nyquist sampling theorem dictates that the sampling rate be at least twice the bandwidth of the IF signal. With the digital sample clock signal, $F_s$, chosen according to these guidelines, the output samples from the sampler 14 are thus in in-phase and quadrature order as I, Q, -I, -Q, I,Q . . . and so on. The I and Q samples are then routed on separate signal buses, $I_s$ and $Q_s$, along with the $F_s$ signal, to the channels 22.

Each channel 22 is assigned to process the signal transmitted by one of the satellites which is presently within view of the antenna 11. A given channel 22 thus processes the $I_s$ and $Q_s$ signals and tracks the carrier and code of the signal transmitted by its assigned satellite.

In particular, each channel 22 uses a carrier/code synchronizing circuit to frequency and phase-track the PRN encoded carrier signal by maintaining an expected Doppler offset unique to the desired satellite. Each channel 22 also maintains a phase lock with a locally generated PRN code reference signal, by using two correlators connected as a delay lock loop (DLL).

The locally generated PRN code reference signal is then used to decode the data from the assigned satellite. The resulting decoded data, including the satellite's ephemeris, time of day, and status information, as well as the locally generated PRN code phase and carrier phase measurements, are provided to the processor 16 via the control bus 18. The channels 22 are described in detail in connection with FIG. 4.

The sampler 14 and channels 22 are controlled by the processor 16 via the control bus 18. The processor 16 includes a central processing unit (CPU) 162 which typically supports both synchronous-type input/output (I/O) via a multiple-bit data bus DATA, address bus ADDR, and control signals CTRL and synchronous controller circuit 164, and an interrupt-type I/O via the interrupt signals, INT and an interrupt controller circuit 166. A timer 168 provides certain timing signals such as the measurement trigger MEAS. The operation of the processor 16 and its various functions implemented in software will be better understood from the following discussion.

Figure 2:
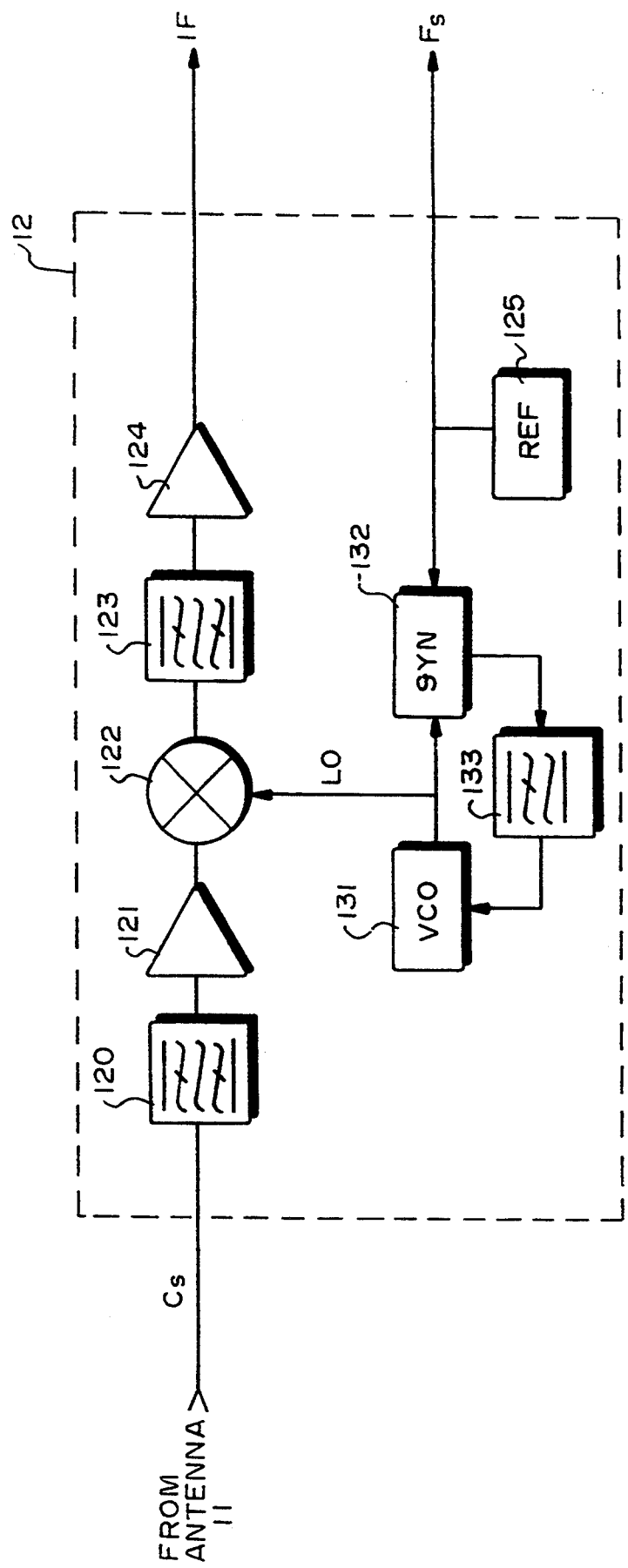
FIG. 2 is a block diagram of the downconverter circuit.

Referring now to FIG. 2, the downconverter 12 includes a bandpass filter 120, low noise amplifier 121, mixer 122, intermediate-frequency filter 123, and final amplifier 124.

The composite signal $C_s$ received from the antenna 11 typically consists of PRN modulated signals from all satellites within view (that is, within a direct line-of-sight of the receiver 10), any interfering signals, and noise. The PRN modulated signals of interest typically use L-band carrier frequencies—the carrier signals used by various PRN ranging systems are as follows:

| PARAMETERS FOR CERTAIN PRN RANGING SYSTEMS | | | |
|---|---|---|---|
| L-Band Carrier | Frequency | PRN Code Rate | Power |
| GPS L1 C/A | 1.57542 GHz | 1.023 MHz | −160 dBW |
| GPS L1 P | 1.57542 GHz | 10.23 MHz | −163 dBW |
| GPS L2 | 1.22760 GHz | 10.23 MHz | −166 dBW |
| GLONASS C/A | 1.602 . . . 1.616 GHz | 511 KHz | |
| GLONASS P | 1.602 . . . 1.616 GHz | 5.11 MHz | |

Natural background noise at about −204 dBW/Hz is typically mixed in with the L-band signals as well.

The composite signal $C_s$ is first fed to the bandpass filter 120 which is a low insertion-loss filter having a bandpass at the desired carrier frequency. The bandpass filter 120 should be sufficiently wide to allow several harmonics of the PRN code chips to pass. In the preferred embodiment for GPS C/A code reception, this bandwidth is at least 10 MHz.

After the received signal passes through the low-noise pre-amplifier 121, the mixer 122 downconverts it from the carrier frequency to a desired intermediate frequency that is within the frequency range of the sampler 14. The intermediate frequency filter 123 is also a bandpass filter. It serves as a pre-correlation filter having a sufficiently narrow bandwidth to remove any undesired signals, but sufficiently wide to maintain the desired bandwidth for detection. As will be described later, the bandwidth selected for this precorrelation filter 123 significantly affects the performance of the receiver 10 in multipath fading environments, and again is typically at least 10 MHz.

The final amplifier 124 is used as a pre-amplification stage to provide the output IF signal with appropriate amplification. Although the illustrated downconverter 12 is a single-stage downconverter, there could, of course, be additional intermediate stages.

A local reference oscillator 125 provides a stable frequency, digital, signal as the sample clock signal, $F_s$, to both a synthesizer 132 and the sampler 14 (FIG. 1). A voltage controlled oscillator (VCO) 131, also coupled to the reference oscillator 125, generates an analog local oscillator reference signal, LO, whose frequency is a predetermined harmonic of the fundamental frequency of the digital reference signal, $F_s$. This is accomplished by the synthesizer 132, which frequency-divides the LO signal by a predetermined number, multiplies it with the sample clock signal $F_s$, and then feeds this output to a low-pass filter 133 which, in turn, provides a control voltage to the VCO 131. The VCO provides the reference signal LO to the synthesizer 132 and mixer 122.

Figure 3:
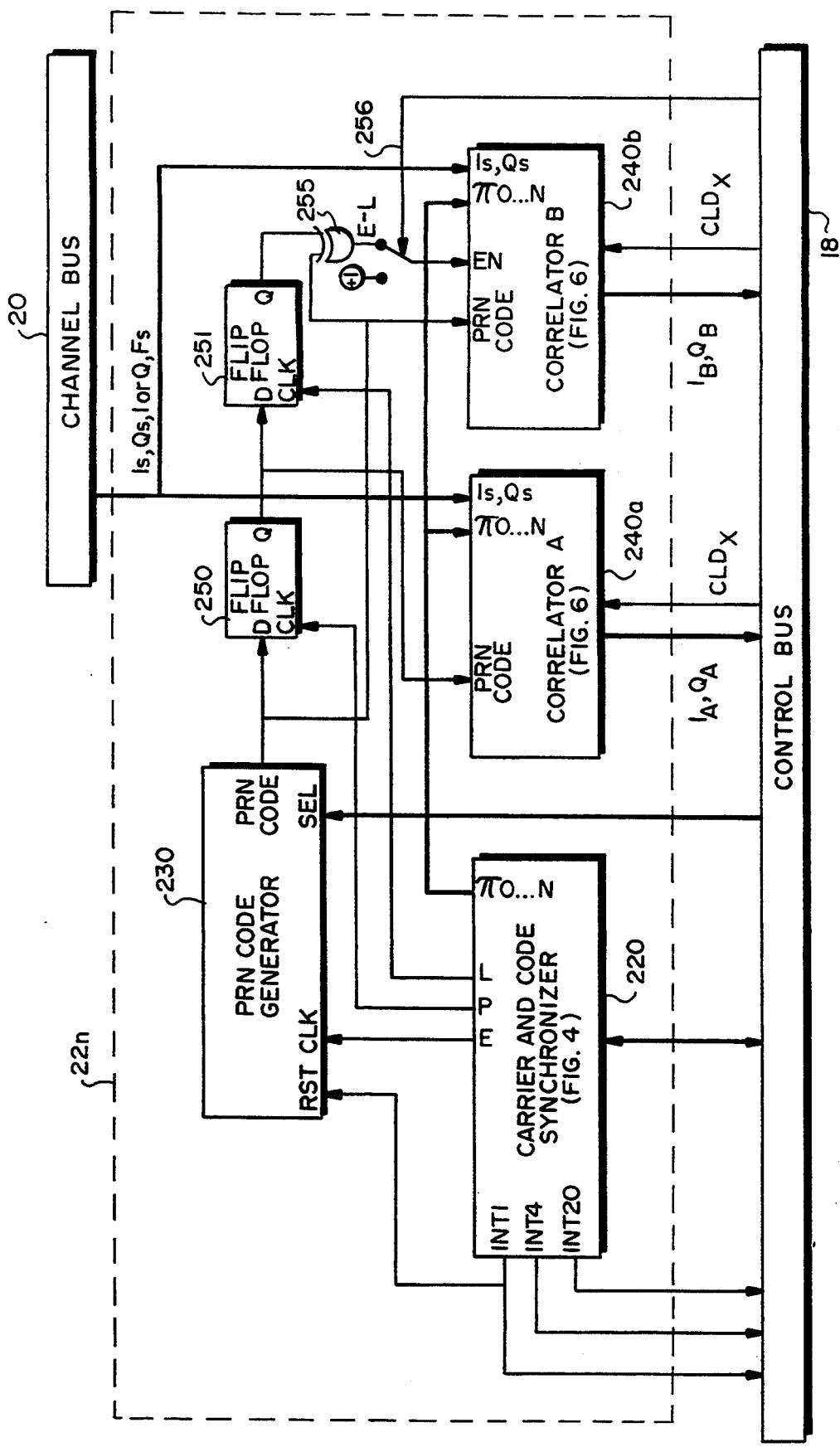
FIG. 3 is a block diagram of the channel circuit.

A typical channel $22n$ is shown in FIG. 3. It includes a carrier/code synchronizer circuit 220, PRN code generator 230, two correlators 240a and 240b (collectively, correlators 240), and a code delay line formed by the flip-flops 250 and 251, XOR gate 255, and a switch 256.

Briefly, the synchronizer 220 is a single numerically controlled oscillator (NCO) which uses the sample clock $F_s$ and appropriate instructions from the processor 16 to provide the control signals required by PRN code generator 230 and correlators 240 to non-coherently track the frequency and any carrier phase error caused by residual Doppler, as well as to track the PRN code.

The code generator 230 uses signal pulses output by the synchronizer 220 to generate a local PRN reference signal, PRN CODE, corresponding to the PRN code associated with the satellite assigned to channel $22n$. The PRN CODE signal is also forwarded to the delay line flip-flops 250 and 251 which provide the PRN CODE signal, with selected delays, through the XOR gate 255 and switch 256 to the correlators 240. PRN code generators such as code generator 230 are well known in the art.

The correlators 240 also receive the $I_s$, $Q_s$, and $F_s$ signals from the channel bus 20. They may be configured in two modes—the switch 256 is used to select between the modes. In the first, (early, late) mode, correlator B 240b is configured as an early correlator and correlator A 240a is configured as a late correlator. This first mode is preferably used for initial PRN code synchronization. In a second, (punctual, early-minus-late) mode, correlator B 240b is configured as "early minus late" and correlator A 240a as punctual. This second mode is used for carder and PRN code tracking. Both correlators 240 correlate, rotate, and accumulate the $I_s$ and $Q_s$ samples, and then provide accumulated sample outputs $I_A$, $Q_A$ and $I_B$, $Q_B$ to the processor 16.

Figure 4:
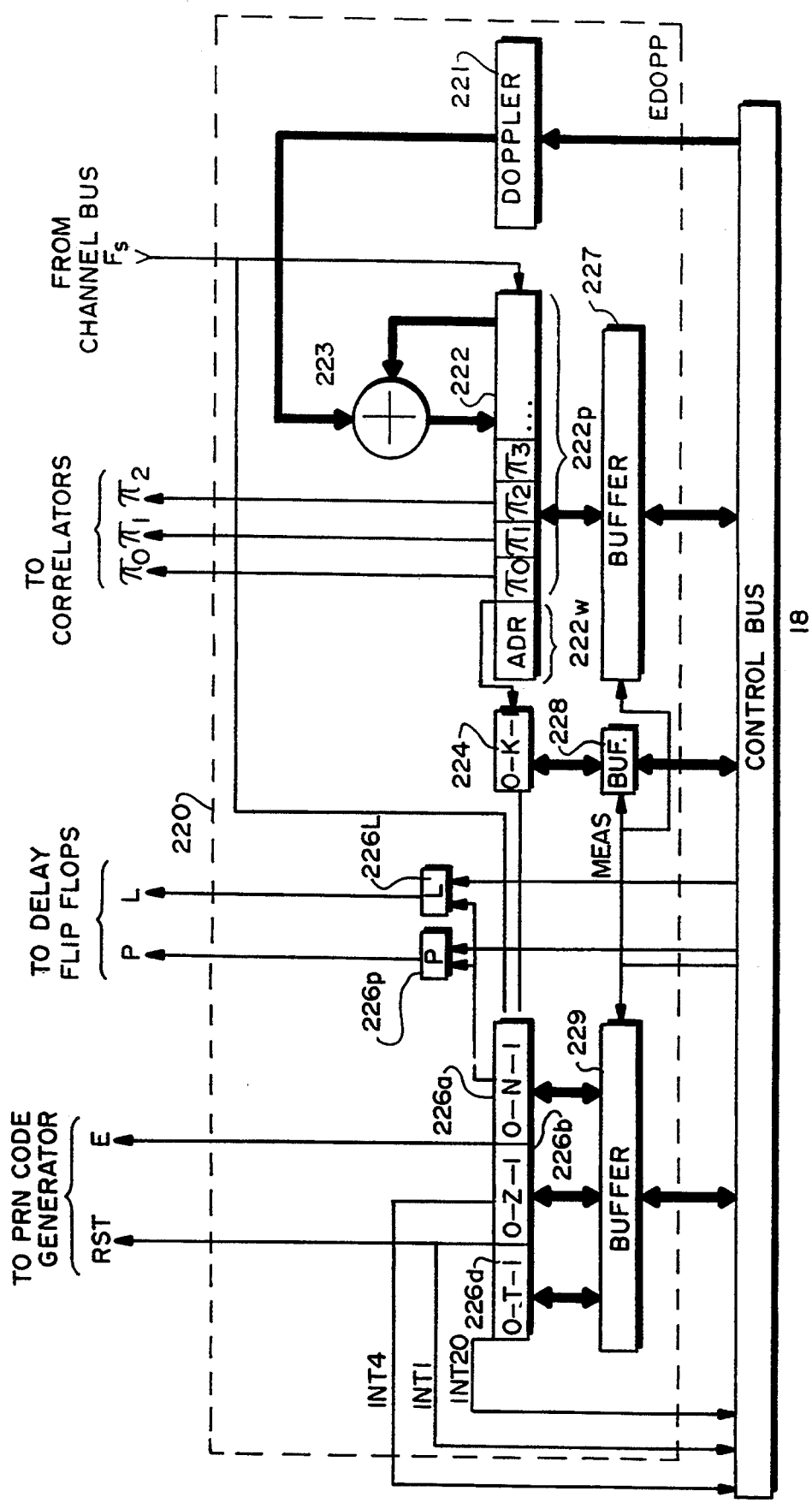
FIG. 4 is a block diagram of a carrier/code synchronizing circuit used in each channel circuit.

FIG. 4 is a detailed block diagram of the carrier/code synchronizer 220, which includes an expected Doppler rate register 221, an accumulated delta range (ADR) register 222, and a fine chip counter 224. A code phase generator circuit 226 includes a subchip counter 226a, chip counter 226b, epoch counter 226d, and P-comparator 226p and L-comparator 226l. Buffers 227, 228, and 229 allow the processor 16 to load, read, and add to or subtract from the contents of the various counters and registers.

The synchronizer 220 accepts the sample clock signal $F_s$ from the channel bus 20, an expected Doppler value EDOPP and corrected values for the registers and counters 222, 224 and 226 from the control bus 18. In response to these inputs, it provides a clock signal E and reset signal RST to the PRN code generator 230, and also provides clock signals P and L to the delay line flip-flops 250 and 251 (FIG. 3), as well as provides interrupt signals INT1, INT4, and INT20 to the control bus 18. An instantaneous carrier phase angle estimate is also provided via bits $\pi_0, \pi_1 \ldots \pi_n$ to the correlators 240.

The contents of the ADR register 222 and code phase generator 226 provide an instantaneous estimate of the transmit time of the particular satellite signal assigned to channel 22n. The difference between this estimate of the transmit time and the receiver time of day (as estimated by the timer 168 in FIG. 1) is then taken as the propagation time of that signal plus any receiver clock offset. By multiplying the propagation time by the speed of light, a precise measurement of the range from the receiver 10 to the assigned satellite is made. These measurements occur at selected time indicated by the measurement strobe MEAS from the timer 168, and are typically taken simultaneously across all the channels 22. The resulting range to each satellite is then used by the processor 16 to compute the position of the receiver 10.

Figure 5:
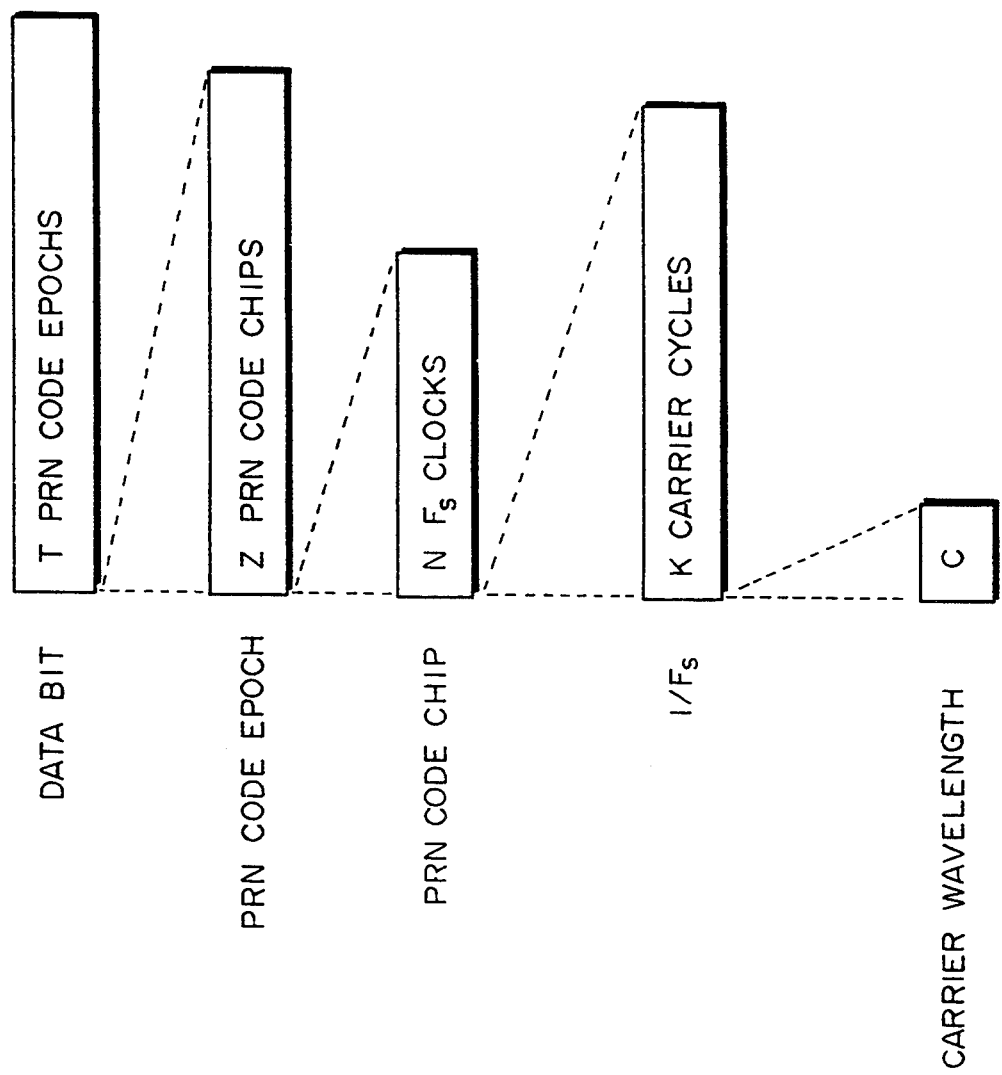
FIG. 5 is a timing diagram showing the relative duration of various portions of a received PRN signal.

Before proceeding with a further discussion of the various components of the synchronizer 220, reference should be made to FIG. 5 which shows, on a distorted time scale, the relative durations of various components of a PRN ranging signal and certain other signals in a preferred embodiment of the synchronizer 220. For example, starting at the bottom of FIG. 5, a single carrier cycle has a particular duration, C. A single cycle of the digital sample signal clock $F_s$, consists of K carrier cycles. A PRN code chip includes N cycles of the $F_s$ signal, and a PRN code epoch consists of Z PRN code chips, where Z is also known as the sequence length of the PRN code. One data bit typically consists of T PRN code epochs. For the preferred embodiment of the invention adapted to receive the GPS L1 ranging signal, the carrier frequency is 1575.42 MHz, and K is 77, so that $F_s$ equals 20.46 MHz. In addition, N is 20, so that the PRN code chip rate is 1.023 MHz, and Z is 1023, so that the PRN code epoch rate is 1 kHz. T is also 20, so that the data bit rate is 50 Hz.

Now returning to FIG. 4, the synchronizer 220 will be described in greater detail. The expected Doppler rate register 221 is loaded via the processor bus 18 with an estimated Doppler EDOPP for the particular satellite tracked by channel 22n. In most instances, such as when the receiver 10 has been operating for some time, the EDOPP estimate may be taken from almanac data already received from satellites to which the receiver 10 has been synchronized, since the almanac data from each satellite includes an estimated position and viewing of all other operating satellites. However, if this almanac data is not available, such as when the receiver 10 is first turned on, this estimate is determined by successive approximation techniques which will be described in greater detail shortly.

The Doppler value is specified in carrier Doppler cycles per $F_s$ pulse. For example, if the expected Doppler frequency is +4.45 kilohertz (kHz), which is a possible Doppler frequency for a stationary receiver and an approaching satellite, dividing by a typical $F_s$ frequency of 20.46 MHz for the GPS L1 embodiment results in an expected Doppler shift of approximately 0.00044 carrier cycles per $F_s$ pulse. Specified in this way, the Doppler value will always be less than one.

The ADR 222 is divided into a whole cycle portion 222w and a partial cycle portion 222p. As shown, an adder 223 is arranged to add the contents of the Doppler register 221 to the partial cycle portion 222p of the ADR 222 upon the occurrence of every $F_s$ pulse. The most significant bits $\pi_0, \pi_1 \ldots \pi_n$ of the partial cycle portion 222p thus provides an instantaneous expected carrier phase angle in cycles.

When the partial cycle register 222p has a carry out, the whole number portion 222w is incremented and the fine chip counter 224 is also incremented. If the partial cycle register 222p requires a borrow, then the whole number portion 222w and fine chip counter 224 are decremented.

The subchip counter 226a is clocked by the $F_s$ signal and controlled by the fine chip counter 224. Subchip counter 226a is nominally a 0 to N−1 counter controlled directly by the $F_s$ signal, but may be adjusted to count one extra cycle or one fewer cycle depending upon the state of the fine chip counter 224. In particular, when the fine chip counter carries out, i.e., increments from K-1 to 0, a cycle is stolen from the sub chip counter 226a to keep it synchronized with the ADR 222. In other words, this event causes the subchip counter 226a to count only to N-2 for one iteration.

When the fine chip counter 224 borrows, i.e., decrements from 0 to K-1, a cycle is added to the subchip counter 226 so that it counts from 0 to N for one iteration.

By periodically removing or adding one cycle of the sample clock $F_s$, the locally generated PRN code (as controlled by the output signals RST and E of code phase generator 226) remains synchronized with the locally generated carrier phase (as indicated by the state of the ADR 222). With this arrangement, as long as the carrier phase indicated by the ADR 222 remains locked to the incoming carrier, the code phase generator 226 will remain locked to the incoming PRN code. This is accomplished non-coherently, in the sense that the local reference signal, $F_s$, need not remain phase locked to the carrier of the intermediate frequency signal, IF, in order for the PRN code generator 230 to remain phase-locked.

Figure 6:
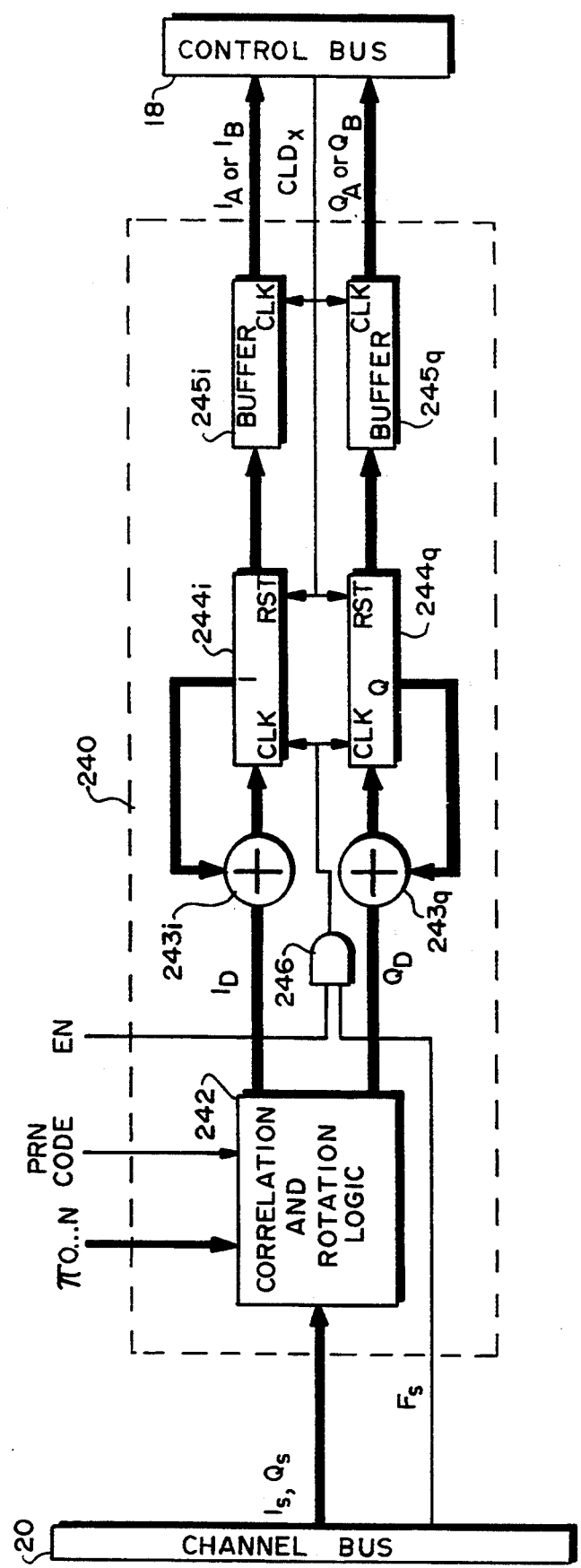
FIG. 6 is a block diagram of a correlator circuit used in each channel circuit.

The most significant bit of the subchip counter 226a is used as the early clock signal, E, to indicate a PRN code chip edge. The early cock signal E is in turn used to clock the local PRN code generator 230. In the preferred embodiment for the GPS L1 carrier, the subchip counter 226a counts from zero to nineteen since N equals twenty, i.e., there are twenty $F_s$ cycles per PRN code chip (FIG. 6).

The P-comparator 226p and L-comparator 226l are each connected to receive the contents of the subchip counter 226a. The P-comparator 226p provides a P clock signal used as a punctual indicator to the delay flip-flop 250. A pulse is output on the P clock signal whenever the contents of the subchip counter 226a equals the contents of a register within the P-comparator 226p. Likewise, the L-comparator 226l provides an L clock signal which gives a late indication to delay flip-flop 251. The contents of the P and L comparators may be written via the control bus 18 to adjust the relative time delay between the E and P clock signals and the P and L clock signals. As will be described shortly, the E, P, and L clock signals are used to control the correlators 240 to provide early and late, and punctual and early-minus-late delay lock loops (DLLs).

The chip counter 226b is used to determine the duration of a complete PRN code sequence. For the GPS embodiment, there are 1,023 C/A code chips in a PRN code epoch, and thus the chip counter 226b counts from zero to 1022. The most significant bit, INT1 indicates the end of a complete PRN code epoch; it is used to reset the local PRN code generator 230. Another clock signal, INT4, which is four times the rate of INT1 (i.e., the third most significant bit of the chip counter 226b) is also generated. Both INT1 and INT4 are used to interrupt the processor 16 to service the correlators 240 during an initial locking sequence, as will be described shortly.

Finally, the epoch counter 226d is used to indicate the end of a data bit, after T PRN code epochs. This indication is given by the most significant bit of the epoch counter 226d, which is output as the INT20 signal.

The carrier tracking loop is inherently much more sensitive than the code DLL and is able to measure small changes extremely accurately. Assuming the carrier loop is tracking properly, the fine chip counter 224 in conjunction with the subchip counter 226a, enables the channel 22n to accurately track any relative motion of the receiver 10 with respect to the satellite.

Returning to FIG. 3 briefly, the operation of the correlators 240 as a DLLs will now be described in greater detail. It can be seen that the PRN CODE signal is forwarded to the first flip-flop 250, which is in turn clocked by the punctual clock signal P. Thus, the Q output of the flip-flop 250 provides a locally generated PRN code reference signal precisely aligned with the expected PRN code which was modulated onto the carrier signal by the satellite. The Q output of flip-flop 250 is forwarded to the PRN CODE input of correlator 240a as well as the input of flip-flop 251. Flip-flop 251 is clocked by the late clock signal L; in the preferred embodiment, then, flip-flop 251 thus provides a late PRN code reference signal which has been delayed relative to the Q output of flip-flop 250.

The switch 256, controlled by the processor 16, determines the mode of correlator 240b. If the switch 256 is directly connected to the +1 input, a first mode called (Early, Late) is entered in which the correlator 240b functions as an early correlator, since the PRN CODE is provided directly to the PRN CODE input of correlator 240b, in synchronism with the early clock signal E.

The (early, late) mode is used for code search and pull in modes. To adjust the PRN code phase, any difference in signal strength between the Early and Late correlators (as estimated by summing the I and Q channel signal level in each of the early and late correlators) is detected by the processor 16, which in turn causes a different value to be loaded into the code phase generator 226 via the buffer 229.

When the switch 256 is in the position shown, the second, or (punctual, early-minus-late) mode is enabled in which the XOR gate 255 provides an "early minus late" clock signal E-L to enable the correlator 240b. This mode is used for steady state tracking, and provides increased code phase measurement accuracy in the presence of multipath fading.

In either mode, the time delay spacing between the E, P, and L signals may be adjusted, by changing the values in the P and L registers 226. In the embodiment of the invention being described, the sub-chip counter 226a counts in 1/20ths of a C/A code chip time, so that the spacing may be selected from one (1) C/A code chip time down to as little as 0.05 of a C/A code chip time.

By referring now to FIG. 6, the operation of a typical correlator 240a will be understood in greater detail. Correlator 240 consists of decoding and rotation logic 242, a pair of adders 243i and 243q, a pair of registers 244i and 244q, and a pair of buffers 245i and 245q. Correlator 240a accepts the $I_s$ and $Q_s$ samples, and the sample clock $F_s$, and IORQ from the channel bus 20 along with the instantaneous carrier phase bits $\pi_0, \pi_1 \ldots \pi_n$ from the synchronizer 220 and the PRN code signal from the delay line 250. Correlator 240b also receives an enable control line EN. Correlators 240a have this control line EN permanently enabled. The correlators 240 also receive correlator load pulses $CLD_x$ from the interrupt controller 166 via the control bus 18.

In operation, the correlator 240a multiplies the incoming samples $I_s$ and $Q_s$ with the locally generated PRN CODE reference signal, rotates the result by the instantaneous carrier phase angle estimate as represented by the bits $\pi_0, \pi_1 \ldots \pi_n$ and then accumulates the result in registers 244 using the adders 243. The contents of the registers 244 are forwarded to the buffers 245 and then to the processor 16 upon each $CLD_x$ pulse. The registers 244 are cleared to restart the next accumulation.

The decoding and rotation logic 242 performs the following arithmetic on its input signals:

$$I_D = I_s \cdot \text{PRN} \cdot \cos(\Theta) + Q_s \cdot \text{PRN} \cdot \sin(\Theta)$$

$$Q_D = Q_s \cdot \text{PRN} \cdot \cos(\Theta) - I_s \cdot \text{PRN} \cdot \sin(\Theta))$$

where PRN is the current value of the PRN CODE input and $\Theta$ is the instantaneous carrier phase estimate represented by the bits $\pi_0, \pi_1 \ldots \pi_n$. By performing code correlation and removing the instantaneous Doppler shift in the same operation at every $F_s$ clock pulse, signals with very high Doppler offsets may be processed before any significant power loss is encountered.

The adders 243 and registers 244 perform a low frequency filtering function on the $I_D$ and $Q_D$ data, by simple accumulation of successive samples, to produce averaged in-phase and quadrature samples, $I_A$ and $Q_A$ The Doppler frequency estimate EDOPP is maintained by the processor 16, using either an automatic frequency control (AFC) loop technique or a phase lock loop (PLL) technique. The AFC loop approach uses a frequency error estimator $F_e = I_A(t-1) * Q_A(t) - I_A(t) * Q_A(t-1)$, where (t) and (t−1) indicate the present and previous sample sets respectively. By calculating $F_e$, an indication of how much to correct the Doppler estimate EDOPP is thus provided. The alternative PLL technique uses a phase error estimate, $P_e = \arctan(Q_A/I_A)$, to control the phase. The carrier phase is then controlled by making minor changes to the EDOPP value. The $F_e$ term gives an indication of carrier frequency error, while the $P_e$ term gives an indication of carrier phase error.

Synchronization of the receiver 10 can now be better understood by referring back to FIG. 4. In general, carrier and code drift is detected by determining the difference in the outputs of the correlators 240a and 240b. When a difference is detected, the synchronizer 220 is corrected by adjusting the internal values in its counters, 222, 224 or 226, or Doppler register 221. For example, when the synchronizer 220 is exactly in phase, a correlator which is early by a certain fraction of a PRN code chip time will have the same output power as a correlator which is late by the same fraction of a PRN code chip time. The output power of a punctual correlator 240a and early correlator 240b will also differ by a predetermined amount, in this condition, provided that they are also spaced by a predetermined time delay.

In operation, the operating mode switch 256 (FIG. 4) is initially set to the (early, late) mode, and a code delay of one (1) PRN code chip time is used between the early correlator 240b and late correlator 240a.

Next, the PRN code for the desired satellite is loaded into the PRN code generator 230 via the SEL lines. All possible frequencies and code phase delays are then successively tried in an attempt to obtain frequency and code lock with the satellite signal received from the assigned to channel 22n. In particular, the carrier delays are swept by trying different EDOPP values. Different code delays are swept by adjusting the code counters 224, 226a, and 226b via the buffers 227, 228, and 299. At each code and frequency offset, the outputs from the correlators 240 are read and a correlator power level is calculated to determine whether the current code and frequency are correct. The correlator outputs are compared to predetermined thresholds to determine whether the satellite has been locked onto or not. If lock is not indicated, the next carrier and code phase are tried.

The correlators 240a and 240b must be allowed to dwell for an appropriate time at each code and carrier delay. When searching for strong satellites, where the signal to noise ratio is above 45 dBHz, a dwell time as short as ¼ of a PRN code epoch is used. For weaker satellites, a dwell time approximately equal to the PRN code epoch time is used.

The common clock line CLDx to the correlators 240 is selected to be one of the INT1, INT4, or INT20 signals depending upon the mode of correlator 240. For example, during an initial fast seek mode, the INT4 signal may be used to provide a quick indication of the relative correlator powers. Once frequency lock and code synchronism has been established, the INT20 signal may be used to reduce the time devoted to this task. Fine adjustments to the phase may be continuously made by incrementing or decrementing the individual code phase registers 226 (FIG. 4).

Once the satellite is correctly locked onto the carrier frequency and code phase, the correlators 240 are switched to the (punctual, early-minus-late) mode by moving the switch 256 to the exclusive-OR position. In this mode, the output of correlator 240b is used as required to maintain code lock.

At this time, the delay between the early and late PRN code estimates E and L is also slowly decreased by adjusting the comparator registers 226p and 226l (FIG. 4). By narrowing the DLL delay in this manner, the noise level of the discrimination function performed by the early-minus-late correlator 240b is decreased, and its accuracy is increased, as will be seen, especially in the presence of multipath fading.

Figure 7:
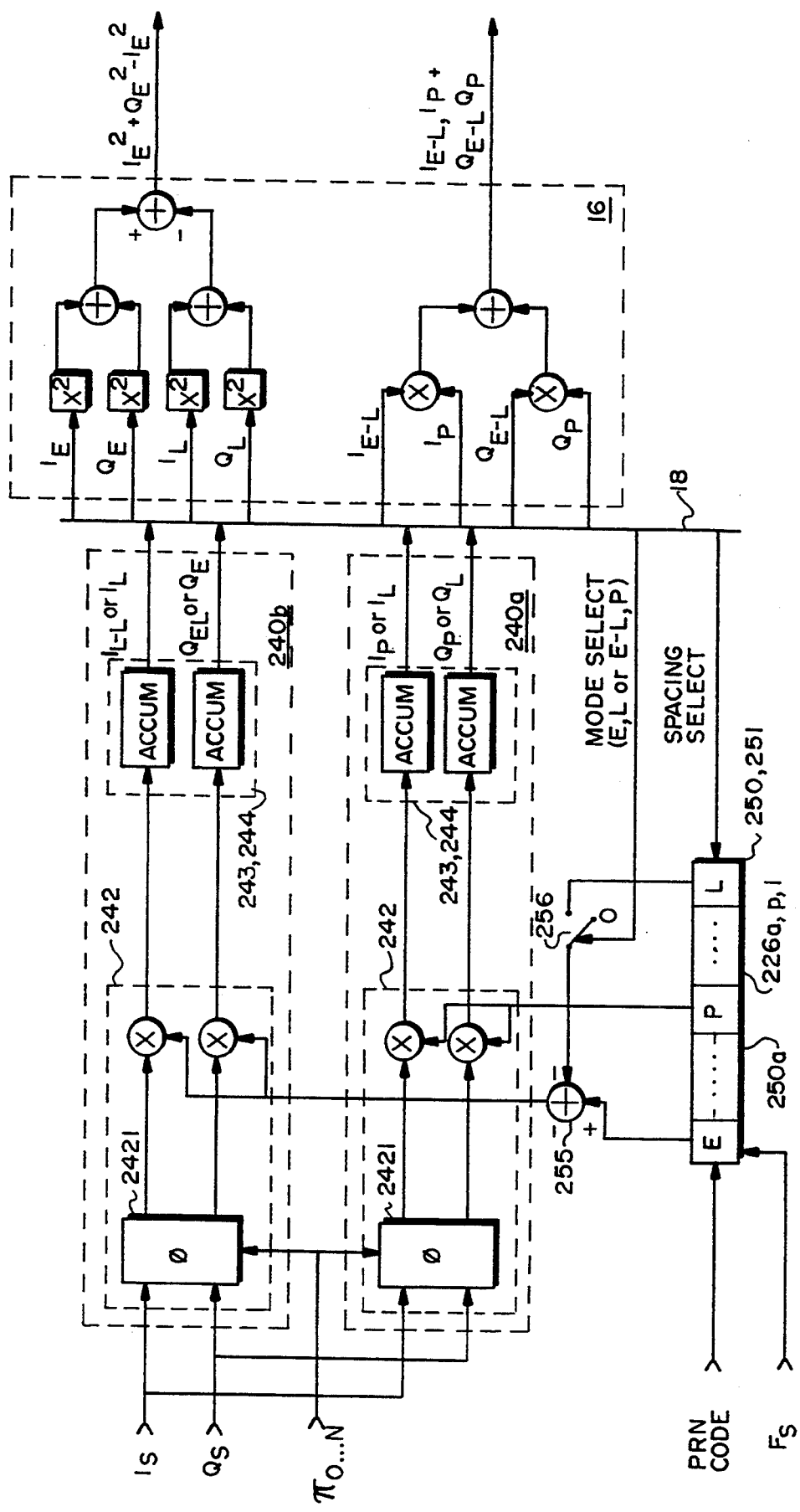
FIG. 7 is signal flow graph representation of the delay lock loop (DLL) operations performed by the correlator circuit and processor circuits to acquire PRN code lock.

To understand why this is so, refer now to FIG. 7, which shows a signal flow graph representation of operations performed by the DLL in each channel 22.

Within each of the correlators 240a, 240b, the incoming $I_s$ and $Q_s$ samples are first phase shifted by the amount indicated by the $\pi_0, \pi_1 \ldots \pi_n$ PRN code phase bits, by a phase shifter 242l, to remove the PRN code phase from the Is and Qs signals.

At the same time, the PRN CODE signal is fed to the data input of a shift register 2500 having selectable spacing between its three output taps, and the $F_s$ signal is fed to its clock input. The shift register 2500 is formed by the sub-chip counter 226a, and code phase comparators 226p and 226l, together with the flip-flops 250, 251 (FIGS. 4 and 6); the delay spacing between early E, punctual P, and late L taps is selected under command of the processor 16. By setting the switch 256, the exclusive-OR gate 255 thus selectively provides either an early (in the first mode) or early-minus-late (in the second mode) version of the PRN CODE signal to correlator 240b. At the same time, the punctual P tap of the shift register 2500 may either be used as a late version (in the first mode) of the PRN CODE signal, or as a punctual version thereof (in the second mode). By sharing the punctual tap P in this manner, the code delay spacing in the (punctual, early-late) mode is limited to 0.1 of a chip time at a minimum.

Each correlator 240 includes a pair of multipliers which generate the DLL signals for each of the I and Q channels. Thus, in the (early, late) mode, the correlator 240b provides an early correlation signal as $\{I_E, Q_E\}$ and the correlator 240a provides a late correlation signal $\{I_L, Q_L\}$.

In the (punctual, early-minus-late) mode, correlator 240b provides an early-minus-late correlation signal $\{I_{E-L}, Q_{E-L}\}$ and correlator 240a provides a punctual correlation signal $\{I_P, Q_P\}$.

The processor 16 then performs the DLL discriminator function to determine PRN code phase lock. One discriminator function of interest is $$I_{Ek}^2 + Q_{Ek}^2 - I_{Lk}^2 - Q_{Lk}^2,$$

referred to as an early/late power measurement. This is preferably used in the (early,late) initial acquisition mode, when the correlator spacing is set to one chip. The other discriminator function of interest is $$I_{E-l,k} I_{Pk} + Q_{E-l,k} Q_{Pk},$$

referred to as a dot-product discriminator. This is preferably used in the steady state with the (punctual, early-minus-late) configuration. In general, carrier phase tracking is better with respect to noise in the dot-product mode because of the availability of a punctual power estimate, which has a greater signal strength in the presence of noise.

By starting the DLL in an acquisition mode having a wider spacing between the (early,late) correlators, and then narrowing the correlator spacing, an advantageous reduction in the susceptibility to multipath distortion is achieved. This is primarily due to the fact that the distortion of the cross-correlation function near its peak due to multipath fading is less severe than in other regions away from the peak. Thus, after the DLL has been initialized and is tracking the transmitted PRN signal near the peak of its autocorrelation function, the delay between correlators is narrowed, without adversely affecting code lock, to reduce the effects of multipath distortion.

Figure 8:
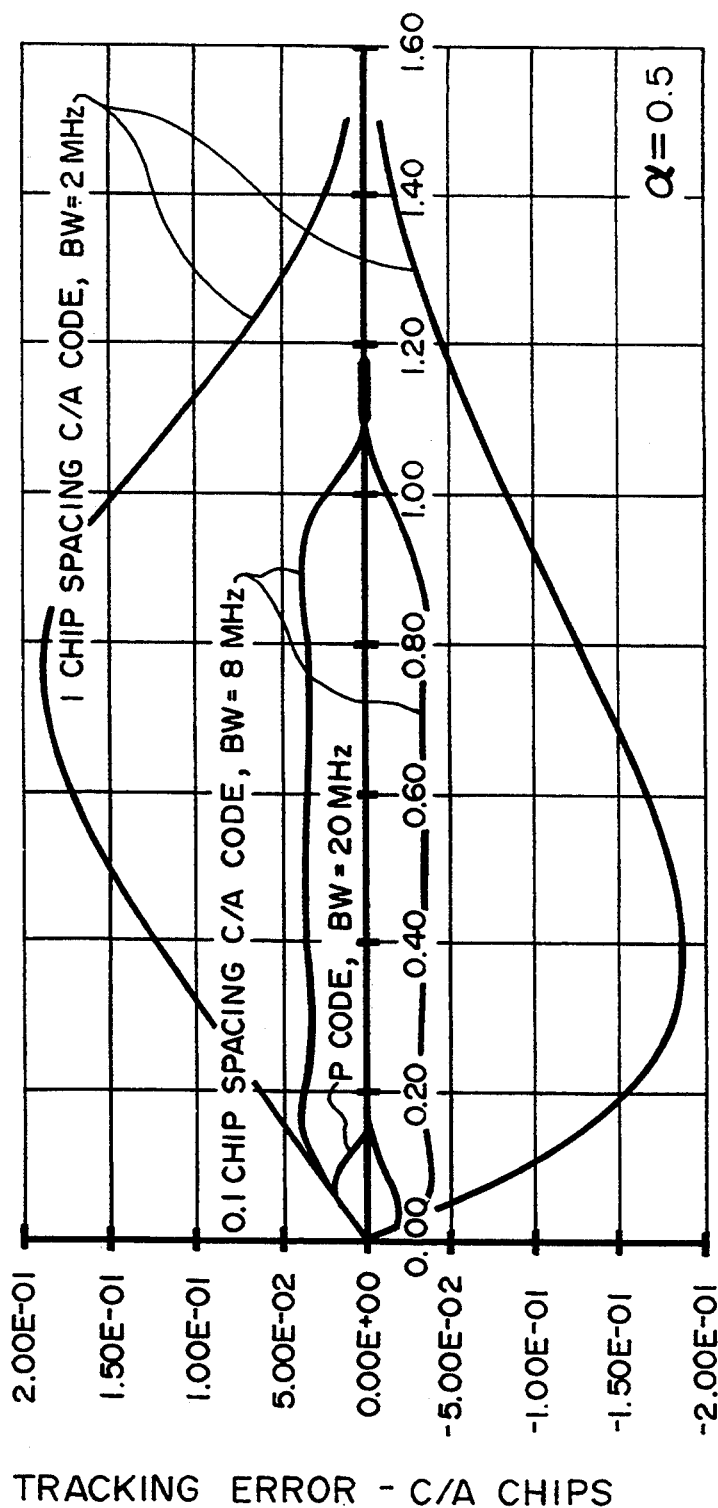
FIG. 8 is a plot of calculated tracking error envelope versus multipath delay for various correlator code delay spacings and pre-correlation filter bandwidths.

FIG. 8 is a theoretical plot of the tracking error envelope, in C/A code chip time, versus multipath delay for the invention. The analysis assumed that the dot-product discriminator (i.e., the steady-state) was to be used, and that the multipath fading of the composite signal could be modeled as $$A \cdot C_f(t) \cdot \cos(w_o t + \phi) + \alpha \cdot A \cdot C_f(t-\delta) \cdot \cos[w_o(t-\delta) + \phi],$$

where A is the signal amplitude, $C_f(t)$ is the filtered PRN code, $w_o$ is the carrier frequency, $\phi$ is the carrier phase, $\alpha$ is the relative multipath signal amplitude, and $\delta$ is the relative time delay of the multipath signal with respect to the true signal.

By then applying the dot-product discriminator used in the steady-state mode, the resulting output signal can be shown to be in the form of:

$$\Delta T_k = \{R_f(\tau_k - d/2) - R_f(\tau_k + d/2)\} \cdot R_f(\tau_k) + \alpha^2 \cdot \{R_f(\tau_k - d/2 - \delta) - R_f(\tau_k + d/2 - \delta)\} \cdot R_f(\tau_k - \delta) + \alpha \cdot \{R_f(\tau_k - d/2) - R_f(\tau_k + d/2)\} \cdot R_f(\tau_k - \delta) \cdot \cos(\phi_m) + \alpha \cdot \{R_f(\tau_k - d/2 - \delta) - R_f(\tau_k + d/2 - \delta)\} \cdot R_f(\tau_k) \cos(\phi_m),$$

where $R_f(t)$ is the filtered PRN code autocorrelation function, $\tau_k$ is code tracking error at time $t_k$, d is the spacing between the early and late correlators in PRN code chips, and $\phi_m$ is the relative phase between the multipath component and the actual signal component.

By setting this expression to zero, and then solving in an iterative manner for $\tau_k$, with $\phi_m$ set to zero and $\pi$ radians, and $\alpha$ set to 0.5, an error envelope can be determined. The error envelope for one-chip C/A code spacing was calculated for a 2 MHz pre-correlation filter bandwidth (element 123 in FIG. 2), which is the typical bandwidth of prior art C/A code receivers. As is evident from the plot in FIG. 8, the 0.1 chip error envelope is indeed much smaller than that for 1.0 chip spacing, but not as small as for the P code envelope.

This is so for several reasons. First, because of the ten times longer PRN code chip time, any given received C/A code chip correlates with multipath delays up to ten times longer in duration than will a given P code chip. Secondly, the 8 MHz bandwidth selected for the 0.1 chip spacing case limits the reduction of the multipath effect.

Figure 9:
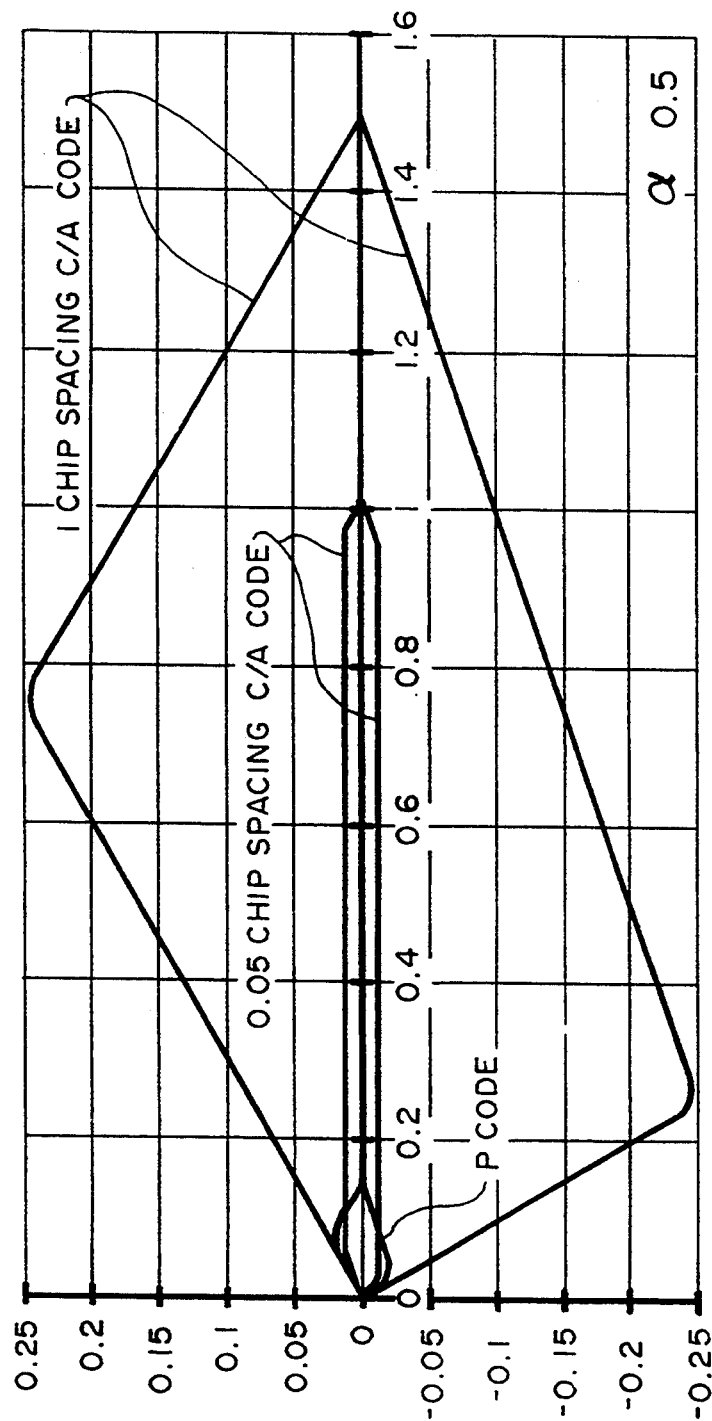
FIG. 9 is a plot of calculated tracking error envelope versus multipath delay for various correlator code delay spacings at a pre-correlation filter bandwidth of 20 MegaHertz (MHz)

To evaluate the effect of increasing the bandwidth of the precorrelation filter 123, the same calculations were performed, but using the usual 20 MHz P-code pre-correlation bandwidth instead. The results are plotted in FIG. 9. Note that the inventive C/A code correlator with narrowed spacing actually outperforms a conventional P-code correlator in the region of 0.15 chip multipath delay or less, This confirms that the selection of pre-correlation filter bandwidth and sampling rate are important factors in determining the overall performance.

To verify that the invention would indeed exhibit improved performance in an actual multipath environment, three GPS receiver channels were connected to a common antenna/preamplifier and programmed to track the same satellite. A first receiver channel was a conventional P-code channel, a second channel was the inventive C/A code channel with fixed one (1) chip correlator spacing, and a third channel was the inventive C/A code channel receiver with dynamically narrowed correlator spacing of 0.1 chip in the steady state. Both C/A code receivers used in the experiment had a pre-correlation bandwidth of 8 MHz.

The collected data were first analyzed to find portions which contained obvious multipath effects. Next, the difference between pseudo-range (PN) (i.e., the range estimate taken from the PRN code measurements) and accumulated delta range (ADR) (i.e., the range estimate taken from carrier measurements) was determined. This removed any satellite motion and satellite clock effects. For a better observation of the improvement possible, the data were also smoothed through a first order digital filter with a 100 second time constant.

Figure 10:
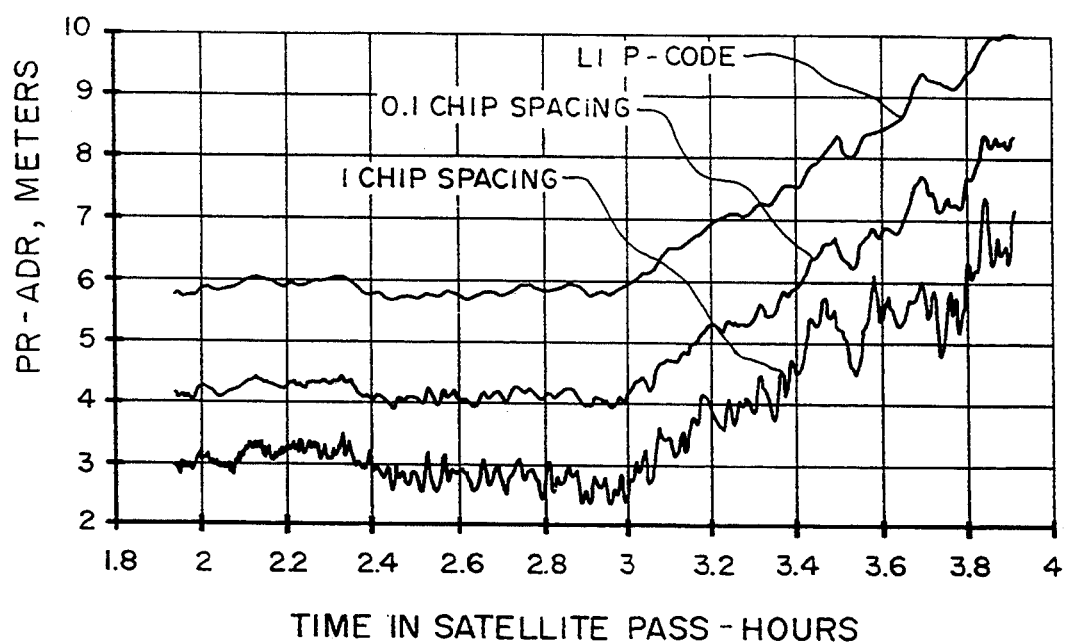
FIG. 10 is a plot of the difference between pseudorange (PR) and accumulated delta range (ADR) measurements versus time for various PRN ranging receivers in a multipath environment, showing the improvement afforded by the invention.

The results are shown in FIG. 10 as a plot of PR minus ADR measurements in meters, versus satellite pass time, in hours. Ramping of the data over the last hour is due to ionospheric code-carrier divergence—over this long a period, the elevation angle of the observed satellite ranged from 40 degrees to 16 degrees. Although a small portion of the multipath effects were possibly filtered as a result of the 100 second filter, the performance of a C/A code correlator with dynamically narrowed spacing is quite similar to that of a conventional P-code correlator.

The multipath effects are most noticeable in the P code and 0.1 C/A code data for which the random, ambient noise does not dominate; the 0.1 C/A code data is obviously much improved.

Figure 11:
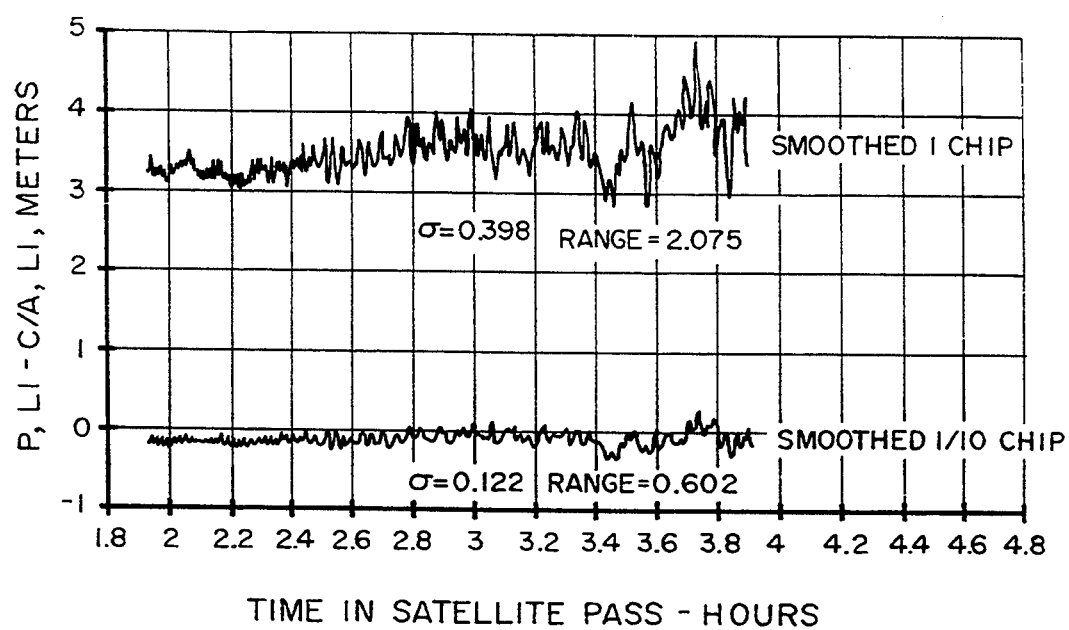
FIG. 11 is a plot of the differential measurement of FIG. 10 having the P-code data subtracted from the two C/A code data traces, which further shows the reduction in variance of the range measurements possible with the invention.

To further identify the improvement in the presence of multipath distortion, the P code data was used a baseline and subtracted from each of the C/A code data traces. The results are plotted in FIG. 11. The standard deviation, $\sigma$, was taken for only the last 36 minutes of operation, to better gauge the effect where the multipath distortion was the greatest. Note the standard deviation for the 1.0 correlator spacing case is at least three times that of the 0.1 chip spacing case—this is about the same as the usually perceived difference between P-code and C/A code systems.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A receiver for demodulating and decoding a composite radio frequency (RF) signal consisting of a plurality of transmitted pseudorandom noise (PRN) encoded signals comprising:

an RF downconverter, connected to receive the composite RF signal and to provide a composite intermediate frequency (IF) signal;

means for generating a local sample clock signal;

a sampling circuit, connected to receive the composite IF signal and the local sample clock signal, and to provide digital in-phase (I) samples and quadrature (Q) samples of the composite IF signal;

a plurality of channel circuits, each channel circuit for demodulating and decoding one of the transmitted PRN encoded signals, and connected in parallel with the other channel circuits such that the each channel circuit receives the I samples and Q samples at the same time as the other channel circuits, wherein each channel circuit further comprises:

a PRN code signal generator, connected to receive a synchronizing adjustment signal and to provide a local reference PRN code signal;

means for decoding the I and Q sample signals, connected to receive the I samples, the Q samples, and the local reference PRN code signal, the decoding means for multiplying the I and Q samples by the local reference PRN code signal, and providing decoded I and Q samples; and autocorrelation means, connected to receive the decoded I and Q samples, for determining the autocorrelation power level at a first and second code phase delay, and for providing the synchronizing adjustment signal to the PRN code generator by comparing the autocorrelation power levels at the first and second phase delays, the first and second phase delays being dynamically narrowed by being set to a predetermined wide correlator delay during an initial acquisition period, and thereafter set to a predetermined narrow correlator delay.

2. A receiver as in claim 1 wherein each channel circuit further comprises:

means for providing an expected carrier phase signal;

a synchronizing circuit, connected to receive the sample clock signal, the expected carrier phase signal, and a synchronizing adjustment signal, and connected to provide an accumulated carrier phase signal and a PRN code phase control signal, the accumulated carrier phase signal and PRN code phase signals being synchronous with each other;

carrier rotation means, connected to receive the I samples, the Q samples, and the accumulated carrier phase signal, for phase-rotating the I and Q samples by an amount indicated by the accumulated carrier phase signal;

wherein the autocorrelation means provides the synchoronizing adjustment signal to the synchronizing circuit, and wherein the PRN code phase signal is provided to the PRN code signal generator.

3. A receiver as in claim 1 wherein the predetermined wide correlator delays is equal to one chip time in the PRN code signal.

4. A receiver as in claim 1 wherein the predetermined narrow correlator delay is equal to a fraction of a code chip time in the PRN code signal.

5. A receiver as in claim 3 wherein the predetermined narrow correlator delay is equal to a fraction of a code chip time in the PRN code signal.

6. A receiver as in claim 1 wherein the correlation power level is determined by a dot-product discriminator.

7. A receiver as in claim 1 wherein the correlation power level is determined by a power discriminator.

8. A receiver as in claim 1 wherein the correlation power level is determined by early and late correlators.

9. A receiver as in claim 1 wherein the correlation power level is determined by punctual and early-minus-late correlators.

10. A receiver for demodulating and decoding a composite radio frequency (RF) signal consisting of a plurality of transmitted pseudorandom noise (PRN) encoded signals comprising:

an RF downconverter, connected to receive the composite RF signal and to provide a composite intermediate frequency (IF) signal;

means for generating a local sample clock signal;

a sampling circuit, connected to receive the composite IF signal and the local sample clock signal, and to provide digital in-phase (I) samples and quadrature (Q) samples of the composite IF signal;

a plurality of channel circuits, each channel circuit for demodulating and decoding one of the transmitted PRN encoded signals, and connected in parallel with the other channel circuits, such that each channel circuit receives the I samples and Q samples at the same time as the other channel circuits, wherein each channel circuit further comprises:

means for providing an expected carrier phase signal;

a synchronizing circuit, connected to receive the sample clock signal, the expected carrier phase signal, and a synchronizing adjustment signal, and connected to provide an accumulated carrier phase signal and a PRN code phase control signal, the accumulated carrier phase signal and code phase signals being synchronous with each other;

a PRN code signal generator, connected to receive the PRN code phase control signal and to provide a local reference PRN code signal;

decoding and carrier rotation means, including means for simultaneously demodulating and decoding the I and Q sample signals, connected to receive the I samples, the Q samples, the local reference PRN code signal, and the accumulated carrier phase signal, the demodulating means for phase-rotating the I and Q samples by an amount indicated by the carrier phase signal, and the decoding means for multiplying the I and Q samples by the local reference PRN code signal, and providing decoded I and Q samples; and correlation means, connected to receive the decoded I and Q samples, for determining the correlation power level at first and second code phase delays, and for providing the synchronizing adjustment signal to the synchronizing circuit by comparing the correlation power levels at the first and second phase delays, wherein the first and second phase delays are dynamically narrowed by being set to a predetermined wide correlator delay equal to a PRN code chip time during an initial PRN code lock acquisition period, and by being set thereafter to a predetermined narrow correlator delay equal to a fraction of a PRN code chip time.

11. A method for demodulating and decoding a composite signal consisting of a plurality of transmitted pseudorandom noise (PRN) encoded signals comprising:

sampling the composite signal in synchronizm with a local sample clock signal, and thereby providing digital in-phase (I) samples and quadrature (Q) samples of the composite signal;

feeding the I samples and Q samples to a plurality of channel circuits, each channel circuit connected in parallel with the other channel circuits such that each channel circuit receives the I samples and Q samples at the same time as the other channel circuits;

within each channel circuit:

generating a local reference PRN code signal in response to a synchronizing adjustment signal;

decoding the I and Q samples, by multiplying the I and Q samples by the local reference PRN code signal, and in response thereto, producing decoded I and Q samples;

determining the correlation power level of the I and Q samples at a first and second code phase delays, and for providing the synchronizing adjustment signal in response thereto, the first and second phase delays being dynamically adjusted from a predetermined wide correlator delay during an initial code lock acquisition period, and thereafter being set to a predetermined narrow correlator delay.

12. A method as in claim 11 further comprising:

providing an expected carrier phase signal;

producing an accumulated carrier phase signal and a PRN code phase control signal which are synchronous with one another, by combining the sample clock signal, the expected carrier phase signal, and a synchronizing adjustment signal; and phase-rotating the I and Q samples by an amount indicated by the accumulated carrier phase signal.

13. A method as in claim 11 wherein the predetermined wide correlator delay is equal to one chip time in the PRN code signal.

14. A method as in claim 11 wherein the predetermined narrow correlator delay is equal to a fraction of a code chip time in the PRN code signal.

15. A method as in claim 13 wherein the predetermined narrow correlator delay is equal to a fraction of a code chip time in the PRN code signal.

16. A method as in claim 11 wherein the correlation power level is determined by a dot-product discriminator.

17. A method as in claim 11 wherein the correlation power level is determined by a power discriminator.

18. A method as in claim 11 wherein the correlation power level is determined by early and late correlators.

19. A method as in claim 11 wherein the correlation power level is determined by punctual and early-minus-late correlators.

* * * * *

UNITED STATES PATENT AND TRADEMARK OFFICE
CERTIFICATE OF CORRECTION

PATENT NO. : 5,390,207
DATED : February 14, 1995
INVENTOR(S) : Patrick Fenton

It is certified that error appears in the above-indentified patent and that said Letters Patent is hereby corrected as shown below:

Column 2, lines 44-55, delete "Certain GPS system designers have realized that the tracking error caused by multipath distortion in the out-of-phase condition can be reduced by narrowing the delay spacing between the early and late correlators in the DLL. However, this has heretofore not been thought to be advantageous under a wide range of operating conditions, since the DLL is then more susceptible to loss of lock due to sudden dynamic motions of the receiver. See, for example, Hagerman, L.L. "Effects of Multipath on Coherent and Non-coherent PRN Ranging Receiver", Aerospace Corporation Report No. TOR-0073(3020-03)-3, 15 May 1973.".

Column 2, line 56, delete "As a result, most" and insert --Most--.

Signed and Sealed this

Second Day of July, 1996

*Attest:*

*Attesting Officer*

BRUCE LEHMAN

*Commissioner of Patents and Trademarks*